US 8,707,923 B2

(12) United States Patent
Vigild et al.

(10) Patent No.: US 8,707,923 B2
(45) Date of Patent: *Apr. 29, 2014

(54) METHOD FOR HEATING THE COMBUSTION AIR OF AN INTERNAL COMBUSTION ENGINE, AND INTERNAL COMBUSTION ENGINE FOR CARRYING OUT A METHOD OF SAID TYPE

(75) Inventors: Christian Winge Vigild, Aldenhoven (DE); Andreas Kuske, Geulle (NL); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/467,846

(22) Filed: May 9, 2012

(65) Prior Publication Data

US 2012/0291762 A1    Nov. 22, 2012

(30) Foreign Application Priority Data

May 16, 2011 (EP) ..................................... 11166155

(51) Int. Cl.
*F02B 3/00* (2006.01)

(52) U.S. Cl.
USPC ...................... 123/179.21; 123/554; 123/556

(58) Field of Classification Search
USPC ........... 123/179.21, 543, 549, 557, 558, 556, 123/198 F; 219/202, 206
See application file for complete search history.

(56) References Cited

U.S. PATENT DOCUMENTS

| | | | | |
|---|---|---|---|---|
| 4,096,697 A | * | 6/1978 | Treuil | 60/599 |
| 4,685,437 A | | 8/1987 | Tanaka et al. | |
| 5,094,198 A | * | 3/1992 | Trotta et al. | 123/179.21 |
| 5,482,013 A | * | 1/1996 | Andrews et al. | 123/179.21 |
| 5,894,832 A | * | 4/1999 | Nogi et al. | 123/491 |
| 6,354,256 B1 | * | 3/2002 | Ohanian et al. | 123/179.21 |
| 6,789,530 B2 | * | 9/2004 | Navalon Carretero et al. | 123/556 |

(Continued)

FOREIGN PATENT DOCUMENTS

| | | |
|---|---|---|
| DE | 19854077 A1 | 5/2000 |
| DE | 10214166 A1 | 10/2003 |
| DE | 102006030464 A1 | 1/2008 |
| EP | 0793399 B1 | 5/2003 |

OTHER PUBLICATIONS

Vigild, Christian Winge et al., "Internal Combustion Engine with Intake Air Heating, and Method for Operating an Internal Combustion Engine of Said Type," U.S. Appl. No. 13/467,847, filed May 9, 2012, 35 pages.

*Primary Examiner* — Hung Q Nguyen
(74) *Attorney, Agent, or Firm* — Julia Voutyras; Alleman Hall McCoy Russell & Tuttle LLP

(57) ABSTRACT

Embodiments for operating an internal combustion engine are provided. One example method for operating an internal combustion engine having at least one cylinder head and at least two cylinders, in which each cylinder has at least one inlet opening for the supply of combustion air into the cylinder, comprises activating a heating device for heating the combustion air when a fuel supply of the internal combustion engine is deactivated, the heating device arranged in an overall intake line coupled to the internal combustion engine, the overall intake line including at least two merged intake lines, each intake line leading to an inlet opening of a respective cylinder.

20 Claims, 4 Drawing Sheets

(56) References Cited

U.S. PATENT DOCUMENTS

| | | | |
|---|---|---|---|
| 7,064,293 B2* | 6/2006 | Geiger et al. | 219/205 |
| 7,278,409 B2* | 10/2007 | Carretero | 123/556 |
| 7,464,699 B2 | 12/2008 | Joppig et al. | |
| 2004/0003800 A1* | 1/2004 | Gschwind et al. | 123/549 |
| 2006/0150959 A1 | 7/2006 | Prust et al. | |
| 2007/0062497 A1* | 3/2007 | Joppig et al. | 123/556 |

* cited by examiner

METHOD FOR HEATING THE COMBUSTION AIR OF AN INTERNAL COMBUSTION ENGINE, AND INTERNAL COMBUSTION ENGINE FOR CARRYING OUT A METHOD OF SAID TYPE

RELATED APPLICATIONS

The present application claims priority to European Patent Application Number 11166155.9, filed on May 16, 2011, the entire contents of which are hereby incorporated by reference for all purposes.

FIELD

The disclosure relates to a method for operating an internal combustion engine.

BACKGROUND AND SUMMARY

Internal combustion engines have a cylinder block and at least one cylinder head which are connected to one another to form the cylinders. To control the charge exchange, an internal combustion engine requires control elements—generally in the form of valves—and actuating devices for actuating said control elements. The valve actuating mechanism required for the movement of the valves, including the valves themselves, is referred to as the valve drive. The cylinder head often serves to accommodate the valve drive.

During the charge exchange, the combustion gases are discharged via the outlet openings of the cylinders, and the charging of the combustion chambers, that is to say the induction of the combustion air, takes place via the inlet openings. If the internal combustion engine is equipped with an exhaust-gas recirculation system, the combustion air may also contain exhaust gas in addition to the fresh air sucked in from the environment. If the fuel is not injected directly into the cylinders but rather is introduced for example into the intake tract upstream of the cylinders, not only the combustion air but rather also the fuel is supplied to the cylinders via inlet openings.

It is the object of the valve drive to open and close the inlet and outlet openings at the correct times, with a fast opening of the largest possible flow cross sections being sought in order to keep the throttling losses in the inflowing and outflowing gas flows low and in order to ensure the best possible charging of the cylinders with fresh mixture, and an effective, that is to say complete, discharge of the exhaust gases.

According to previous approaches, the intake lines which lead to the inlet openings are at least partially integrated in the cylinder head and are generally merged, often to form a single overall intake line, such that at least one so-called inlet manifold is formed.

Various demands are placed on the inlet region of an internal combustion engine. It is sought inter alia to provide an arrangement and design of the intake lines which leads to as small as possible a pressure loss in the intake combustion air in order to ensure good charging of the cylinders with fresh mixture.

The geometry of an intake line furthermore has an influence of the charge movement in the cylinder and therefore on the mixture formation, in particular in direct-injection internal combustion engines. The intake lines are therefore often designed so as to generate a so-called tumble or a spinning flow which should accelerate and assist the mixture formation, wherein a tumble is an air swirl about an imaginary axis which runs parallel to the longitudinal axis of the crankshaft, and a spin is an air swirl whose axis runs parallel to the piston or cylinder longitudinal axis.

During the charge exchange, the pressure along the flow path in the intake duct varies. Such local pressure fluctuations propagate as waves in gaseous media. To make it possible to utilize these dynamic wave processes for the optimization of the charge exchange, it is for example possible for the inlet region to be designed such that, toward the end of the intake stroke, a positive pressure wave arrives at the inlet openings, which positive pressure wave leads to a compression and therefore to a certain follow-up charging effect. Intake lines of variable length are expedient here.

A multiplicity of additional lines, for example the recirculation line of an exhaust-gas recirculation system or the bypass line of a charge-air cooler or of a compressor, may open into the intake line or overall intake line.

Furthermore, internal combustion engines may be equipped with a heating device which is arranged in the inlet region, that is to say intake region, and which serves for heating the intake air. A heating device suitable for use in internal combustion engines is described for example in the German laid-open specification DE 102 14 166 A1 and in the European patent EP 0 793 399 B1.

Said heating devices known from previous approaches comprise strip-like heating elements which are electrically heatable and which have a rectangular cross-sectional outline. The strip-like heating elements are arranged in the inlet region in such a way that their rectangular cross section poses the least possible resistance to the intake combustion air. A first narrow side of the cross section of the strip-like heating elements faces toward the intake combustion air flow, whereas the long sides of the rectangular cross section extend in the flow direction, such that the intake combustion air flows tangentially over the larger longitudinal sides. Such an alignment of the cross section is expedient from a flow aspect but also advantageous with regard to the heat transfer by convection.

According to DE 198 54 077 A1 the heating device may basically also be arranged downstream of a charge-air cooler optionally provided in the intake region. The above-cited approach also discusses the construction of the heating device, in particular the flange which serves as a receptacle or frame, and the design of the strip-like heating elements and the materials or material mixtures used for these.

The heating of the intake air may serve various purposes, for example to shorten the warm-up phase after a cold start, as described in DE 198 54 077 A1.

The German laid-open specification DE 10 2006 030 464 A1 utilizes the heating of the intake air in large-volume diesel engines also outside the starting and warm-up phase in order to avoid misfires at idle when using fuels with a low cetane number. Furthermore, the heating element is activated during the regeneration of the particle filter, and also when the engine torque and the engine speed fall below a predefined minimum value.

However, the inventors herein have recognized that operating an intake heater may be beneficial during additional engine operating conditions. Thus, embodiments for operating an internal combustion engine are provided. One example method for operating an internal combustion engine having at least one cylinder head and at least two cylinders, in which each cylinder has at least one inlet opening for the supply of combustion air into the cylinder, comprises activating a heating device for heating the combustion air when a fuel supply of the internal combustion engine is deactivated, the heating device arranged in an overall intake line coupled to the internal combustion engine, the overall intake line including at least two merged intake lines, each intake line leading to an inlet opening of a respective cylinder.

If the fuel supply is deactivated, the release of heat during the combustion as a result of the exothermic chemical conversion of the fuel, which heat serves to keep the internal combustion engine at operating temperature, is eliminated.

It is therefore advantageous for the heating device to be activated so as to heat the combustion air when the fuel supply of the internal combustion engine is deactivated. This leads to an improvement in emissions behavior and to a reduction in fuel consumption.

It may be taken into consideration in this context that heating of the internal combustion engine by preheated intake air serves not only to maintain the operating temperature but also to maintain the temperature of the engine oil. The associated low viscosity of the oil results in low friction and friction losses, in particular in the bearings which are supplied with oil. This effect has an advantageous influence on the fuel consumption.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
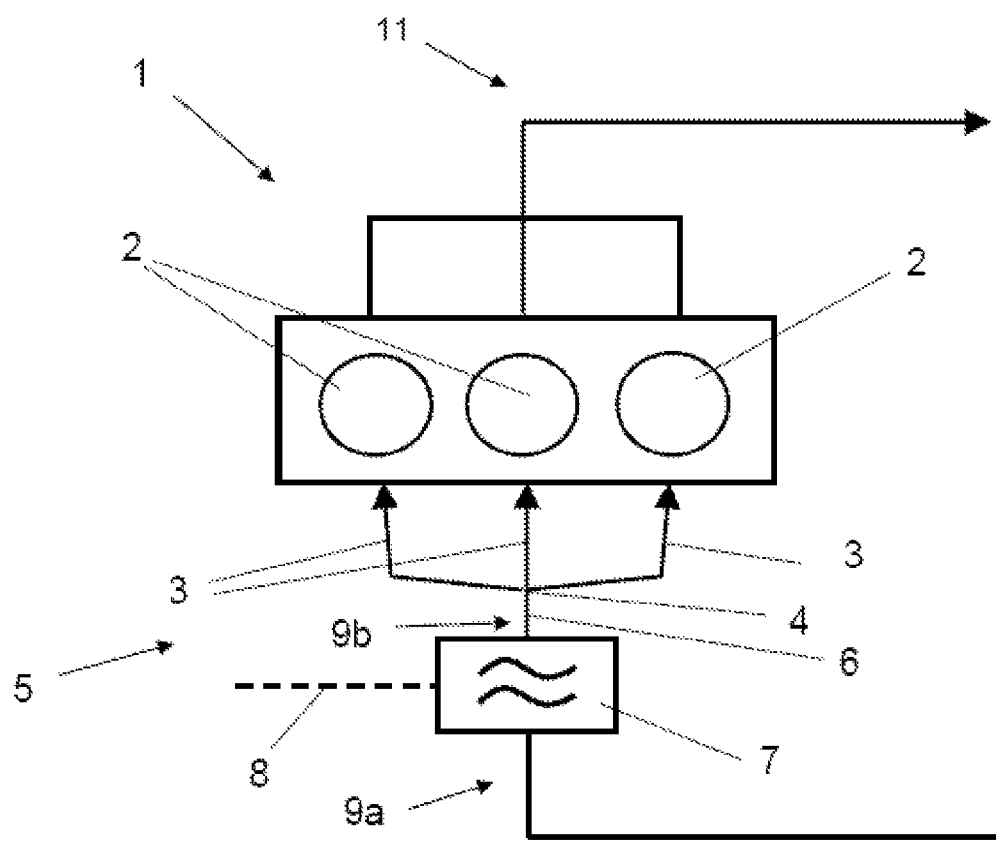
FIG. 1 schematically shows an embodiment of an internal combustion engine.

Intake systems may be equipped with electric heaters in order to rapidly heat the intake combustion air, following a cold engine start, for example. The heating of the intake air helps to decrease engine warm-up times, improving fuel economy and emissions. However, these intake heaters are frequently shut off after the engine has reached a sufficiently warm temperature. During certain operating conditions where the engine may start to cool down, such as during a deceleration fuel shut off (DFSO) operation, otherwise referred to as overrun operation, the heater may be operated to maintain the engine at a desired temperature.

Examples of the method are advantageous in which the heating device for heating the combustion air is activated when the fuel supply of the internal combustion engine is deactivated for a predefinable time period $\Delta t_1$.

The introduction of an additional condition for the activation of the heating device is intended to prevent excessively frequent activation and deactivation of the heating device, in particular an activation of the heating device if the fuel supply is deactivated only briefly, without the need for heating of the intake air by means of the heating device, for example during only a brief period of overrun operation.

Examples of the method are advantageous in which the heating device for heating the combustion air is electrically operated.

Examples of the method are advantageous in which the heating device for heating the combustion air is operated with energy recovered in the overrun mode of the internal combustion engine. In this way, the on-board battery of the vehicle is relieved of load or is not subjected to additional load, that is to say is not discharged by the heating device in the overrun mode.

Examples of the internal combustion engine are advantageous in which the intake lines of at least two cylinders merge to form an overall intake line, such that a distributor junction point is formed, and the heating device is arranged adjacent to the distributor junction point at which the intake lines merge to form the overall intake line, the spacing $\Delta$ between the heating device and the distributor junction point being smaller than the diameter d of a cylinder, $\Delta<d$.

In this embodiment of the internal combustion engine, the heating device is arranged as close as possible to the inlet openings of the cylinders, specifically adjacent to the distributor junction point of an inlet manifold at which the individual intake lines branch off to the at least two cylinders. This arrangement assists the heating device in performing its function, specifically that of providing, that is to say supplying, preheated combustion air to the cylinders.

As a result of the arrangement of the heating device close to the distributor junction point, the path of the preheated combustion air to the cylinders is shortened to the greatest possible extent. The preheated combustion air is therefore given as little distance and time as possible to cool down. The thermal inertia of the part of the intake lines between the inlet opening at the cylinder and the heating device is minimized, specifically as a result of the reduction of the mass and the length of said part.

Said measure ensures that the combustion air is at as high a temperature as possible when it enters the cylinders, as a result of which the largest possible amount of heat is introduced into the cylinders.

Examples of the internal combustion engine are advantageous in which the intake lines of at least two cylinders merge to form an overall intake line within the at least one cylinder head, such that an inlet manifold is formed. The integration of the inlet manifold into the cylinder head further shortens the intake lines and therefore the thermal inertia of the part of the intake lines between the cylinder inlet and the heating device. Said measure furthermore permits dense packaging of the drive unit, and reduces the number of components and therefore the assembly and procurement costs.

Nevertheless, examples of the internal combustion engine may be advantageous in which the intake lines of at least two cylinders merge to form an overall intake line outside the at least one cylinder head, and form an external inlet manifold.

In contrast to concepts known previously, the arrangement of the heating device close to the cylinders makes it possible for the heating device to be used as a guide device for the combustion air for the purpose of obtaining a uniform distribution of the intake combustion air to the individual cylinders.

An internal combustion engine according to the disclosure may also have two cylinder heads, for example if a plurality of cylinders are arranged distributed on two cylinder banks.

It is not necessary for the intake lines of all the cylinders of a cylinder head to merge to form an overall intake line, but rather only the intake lines of at least two cylinders.

Examples are however also advantageous in which the intake lines of all the cylinders of the at least one cylinder head merge to form an overall intake line.

The intake lines may also merge to form two overall intake lines, such that two distributor junction points are formed, if more than two cylinders and/or more than one inlet opening are provided per cylinder. If appropriate, two heating devices should then be provided.

Examples of the internal combustion engine are advantageous in which the spacing Δ between the heating device and the distributor junction point is smaller than one half of the diameter d of a cylinder, Δ<0.5d.

Embodiments of the internal combustion engine are particularly advantageous in which the spacing Δ between the heating device and the distributor junction point is smaller than one quarter of the diameter d of a cylinder, Δ<0.25d.

The additional shortening of the spacing Δ between the heating device and the distributor junction point according to the two abovementioned embodiments assists in further shortening the path to the cylinders for the preheated combustion air, that is to say in reducing the thermal inertia of the part of the intake lines between the cylinder inlet and the heating device.

Within the context of the present disclosure, the spacing Δ between the heating device and the distributor junction point refers to the distance between the outlet from the heating device and the center of the distributor junction point, at which the central filaments of flow of the intake lines meet.

Examples of the internal combustion engine are advantageous in which the heating device has at least one strip-like heating element, a first narrow side of the cross section of which faces toward the intake combustion air flow.

Strip-like heating elements make it possible to use the heating device as a guide device for the uniform distribution of the intake combustion air to the individual cylinders.

Here, examples of the internal combustion engine are advantageous in which the first narrow side of the cross section of the at least one strip-like heating element is substantially perpendicular to the intake combustion air flow.

In internal combustion engines in which the at least two cylinders are arranged in series along the longitudinal axis of the at least one cylinder head, embodiments are advantageous wherein the at least one strip-like heating element is aligned substantially horizontally along a line parallel to the longitudinal axis, preferably parallel to the longitudinal axis of the at least one cylinder head.

Tests have shown that a horizontal alignment of the heating elements is advantageous with regard to the distribution of the intake combustion air to the individual cylinders, and also offers advantages with regard to volumetric efficiency.

In internal combustion engines of the type in question, in which the at least two cylinders are arranged in series along the longitudinal axis of the at least one cylinder head, examples are particularly advantageous wherein the at least one strip-like heating element is aligned substantially vertically, perpendicular and preferably at right angles to a line parallel to the longitudinal axis of the at least one cylinder head.

Such an alignment of the strip-like heating elements is particularly suitable for designing or utilizing the heating elements as a guide device for the heated air flow. With such a guide device, the intake combustion air can be conducted and diverted in an advantageous manner so as to provide a uniform distribution of the air to the individual cylinders. It is sought to obtain uniform charging of the cylinders with fresh mixture. This improves the operating behavior of the internal combustion engine, in particular with regard to pollutant emissions, fuel consumption and the available power.

Examples of the internal combustion engine are advantageous in which the at least one strip-like heating element tapers toward a first narrow end side which faces toward the intake combustion air flow.

This yields advantages from a flow aspect. By virtue of the fact that the heating elements taper counter to the flow direction, less turbulence is generated when the air flow impinges on the heating device. Furthermore, the flow cross section of the overall intake line narrows not in an step-like manner but rather continuously, as a result of which the constriction of the component air flows does not take place abruptly. Here, the heating elements cut into the incident flow of air in the manner of a knife. The resistance posed to the air flow by the heating device is reduced by means of the described design of the at least one strip-like heating element, as a result of which the pressure loss generated across the heating device is also reduced. With the embodiment in question, an impairment of the volumetric efficiency as a result of the heating device is counteracted.

Also advantageous for the reasons stated above are examples of the internal combustion engine in which a first narrow end side, which faces toward the intake combustion air flow, of the at least one strip-like heating element tapers.

In this connection, it may also be taken into consideration that modern internal combustion engines are increasingly equipped with an exhaust-gas recirculation system, by means of which exhaust gas is recirculated into the intake region. The exhaust gas to be recirculated is often cooled before being introduced into the intake region. This may be a problem with regard to the heating device if the exhaust gas is introduced into the intake region upstream of the heating device.

Under some circumstances, during cooling, so much heat is extracted from the exhaust-gas mass flow that some exhaust-gas constituents condense out of the hot exhaust gas and are deposited in the heating device. The exhaust-gas constituents that are condensed out may build up an adhesive layer, which grows with progressive operating duration, on the surface of the heating elements, wherein the solid constituents of the exhaust-gas mass flow, in particular soot particles in the exhaust gas, ultimately also become stuck on said layer when they come into contact therewith. The deposits lead to a constricted flow cross section and possibly to a complete closure of the overall intake line, and impair the heat transfer from the heating element to the intake air. A constriction of the flow cross section of the intake duct is furthermore associated with a pressure loss in the intake flow and an impairment of volumetric efficiency.

A tapering first narrow end side of the at least one strip-like heating element counteracts such deposits. Cross-sectional constrictions as a result of deposits, or even duct blockages caused by condensed-out exhaust-gas constituents, do not pose a risk and are counteracted.

Examples of the internal combustion engine are advantageous in which the cross section of the at least one strip-like heating element is of arc-shaped design, such that the at least one strip-like heating element has a blade-like form.

An arc-shaped design of the strip-like heating element is advantageous with regard to use of the heating device as a guide device. Here, it may be taken into consideration that the distributor junction point is generally arranged centrally in relation to the at least two cylinders, the spatial extent of the junction point is limited, and the preheated air may therefore be diverted to a greater or lesser extent on the path to the cylinders in virtually any embodiment of the internal combustion engine.

The blade-like form of the at least one strip-like heating element permits a diversion of the intake combustion air without losses or with low pressure losses, and a uniform distribution of the air to the individual cylinders.

Embodiments of the internal combustion engine are advantageous in which the heating device has at least two strip-like heating elements which are arranged spaced apart from one another.

The heat transfer area, and therefore the amount of heat that can be transferred to the intake combustion air, also increase with the number of heating elements. The number of heating elements is of not inconsiderable significance with regard to the transfer of heat, because the flow speeds in the overall intake line are high, and the temperature of the heating elements and therefore the temperature difference between the heating elements and the air cannot be increased arbitrarily in order to increase the heat transfer.

The design of the heating device as a guide device is likewise facilitated if a plurality of heating elements is provided and these can be used for influencing the flow.

In internal combustion engines with at least two strip-like heating elements which are aligned substantially vertically, perpendicular to a line parallel to the longitudinal axis of the at least one cylinder head, examples have proven to be advantageous wherein at least two strip-like heating elements are set at an acute angle with respect to one another. Such an arrangement of the heating elements serves to fan out the preheated air flow, as a result of which said air flow is distributed to the cylinders.

In the above-stated type of internal combustion engine, in which the at least two strip-like heating elements are aligned substantially vertically, examples are furthermore advantageous in which at least two strip-like heating elements have a blade-like form, wherein the concave side faces outward.

In this connection, facing outward means that the concave, that is to say inwardly arched side of the wall faces toward the overall intake line or toward the flange, which holds the heating elements, of the heating device, and faces away from the central filament of flow of the combustion air flow. Here, the at least two heating elements open preferably in a funnel-like manner.

Examples of the internal combustion engine are advantageous in which the at least one heating element is held by a flange. Said embodiment makes it possible for the heating device to be provided as a preassembled structural unit and for heating devices of identical type to be used in different internal combustion engines. This increases the quantities produced, and thereby lowers the unit costs. Furthermore, it is made easier to exchange a defective heating device.

Examples of the internal combustion engine are however also advantageous in which the overall intake line holds the at least one heating element, that is to say replaces the flange as a holder.

Examples of the internal combustion engine are advantageous in which a charge-air cooler is provided which is equipped with a bypass line which opens into the overall intake line upstream of the heating device.

The charge-air cooler lowers the air temperature and thereby increases the density of the air, as a result of which the cooler also contributes to improved charging of the cylinders with air, that is to say to a greater air mass. The provision of a bypass line for the charge-air cooler for the purpose of bypassing the cooler has proven to be advantageous in particular after a cold start of the internal combustion engine or during the warm-up phase or in an overrun mode. Cooling of the intake air in these operating states would counteract, that is to say oppose, the heating in the heating device.

Examples of the internal combustion engine are advantageous in which an external exhaust-gas recirculation system is provided which is equipped with a recirculation line which opens into the overall intake line upstream of the heating device.

The recirculation of combustion gases from the exhaust-gas side into the intake region is considered to be expedient for adhering to future limit values for nitrogen oxide emissions, wherein high exhaust-gas recirculation rates which may be of the order of magnitude of $x_{EGR} \approx 60\%$ to $70\%$ are required in order to obtain a considerable reduction in nitrogen oxide emissions.

Here, the recirculation rate $x_{EGR}$ is determined as $x_{EGR} = m_{EGR}/(m_{EGR} + m_{fresh\ air})$, where $m_{EGR}$ denotes the mass of recirculated exhaust gas and $m_{fresh\ air}$ denotes the supplied fresh air.

A cooling device is often provided in the exhaust-gas recirculation line, by means of which cooling device the temperature in the hot exhaust-gas flow is reduced, as a result of which the density of the exhaust gases is increased. The combustion air temperature which results upon the mixing of the fresh air with the recirculated exhaust gases is likewise reduced in this way, as a result of which the cooling device of the exhaust-gas recirculation system also contributes to improved charging of the cylinders. A liquid-cooling arrangement is generally used. If appropriate, it may be advantageous for said cooling device to be equipped—like the charge-air cooler—with a bypass line.

Gas flows introduced into the overall intake line generate turbulence. If the bypass line of a charge-air cooler and/or the recirculation line of an exhaust-gas recirculation system opens into the overall intake line upstream of the heating device, the heating device arranged downstream also serves to calm the combustion air flow.

Examples of the internal combustion engine are advantageous in which a supercharging arrangement is provided. Supercharging serves primarily to increase the power of the internal combustion engine. Supercharging is however also a suitable means for reducing the swept volume for an unchanged level of power, as a result of which—for given vehicle boundary conditions—the load collective can be shifted toward higher loads, where the specific fuel consumption is lower.

Referring now to FIG. 1, it schematically shows a first embodiment of the internal combustion engine 1 which comprises three cylinders 2 arranged in series. It is thus a three-cylinder in-line engine, although other cylinder arrangements are also within the scope of this disclosure. Within the context of the present disclosure, the expression "internal combustion engine" encompasses spark-ignition engines, but also diesel engines and also hybrid internal combustion engines.

The cylinders 2 of the internal combustion engine 1 are supplied with fresh air or combustion air 9a in the inlet region 5 via the overall intake line 6. A heating device 7 for heating the combustion air 9a is arranged in the overall intake line 6. The heating device 7 is itself electrically heatable, for which purpose an electrical terminal 8 is provided.

Downstream of the heating device 7, the overall intake line 6 forks into three intake lines 3 such that a distributor junction point 4 is formed, which intake lines lead to the three cylinders 2.

The combustion air 9a sucked in via the overall intake line 6 is heated as it flows through the activated heating device 7. Subsequently, that is to say downstream of the heating device 7, the heated combustion air 9b is distributed, at the distributor junction point 4, to the individual cylinders 2. The combustion gases are discharged from the cylinders 2 via an exhaust-gas discharge system 11.

Figure 2:
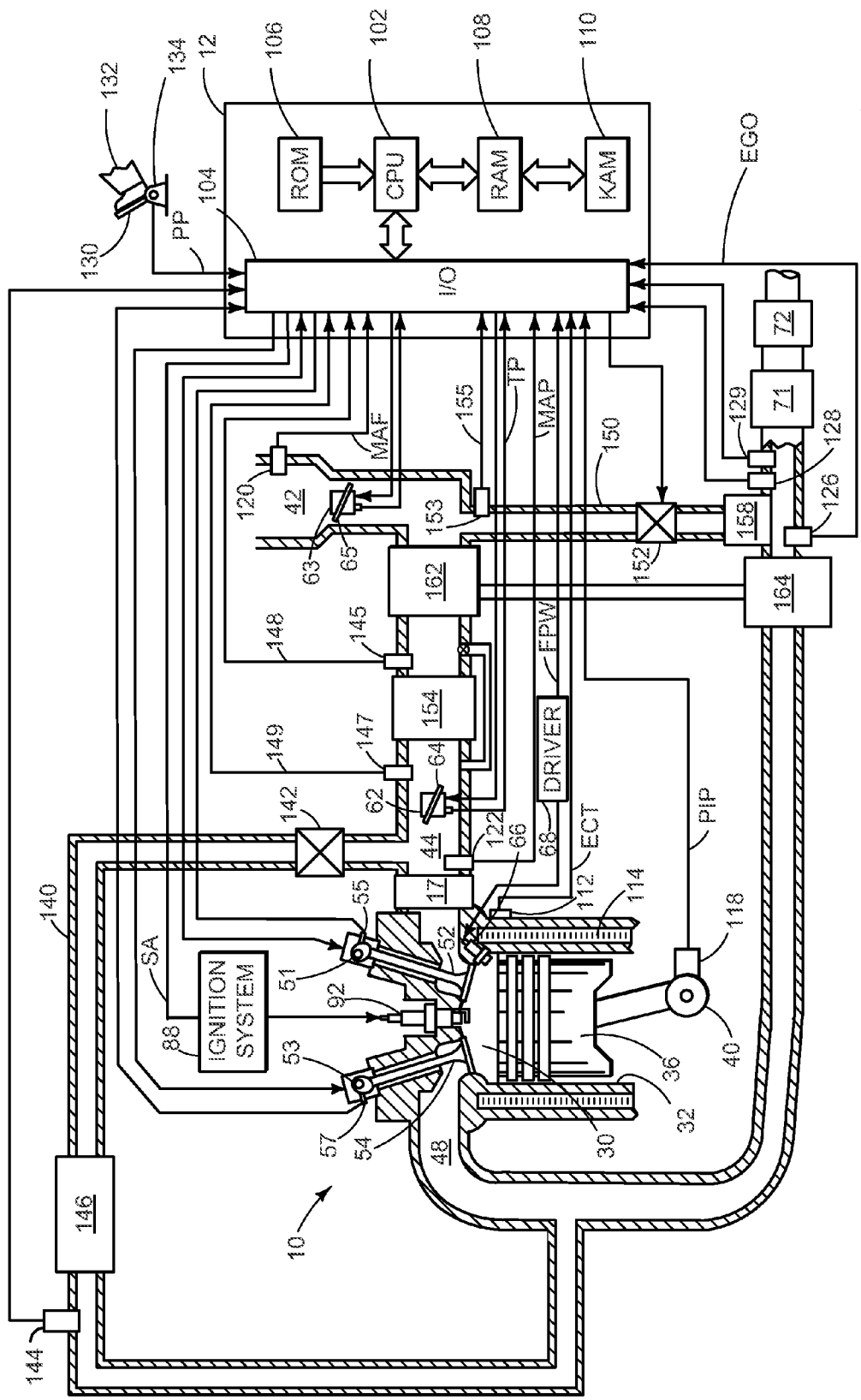
FIG. 2 schematically shows an embodiment of a single cylinder of a multi-cylinder engine.

Referring now to FIG. 2, it shows a schematic diagram of one cylinder of multi-cylinder engine 10, which may be included in a propulsion system of an automobile, is shown. Engine 10 is one non-limiting example of internal combustion engine 1 of FIG. 1.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 (cylinder 30 is one non-limiting example of cylinder 2 of FIG. 1) of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Combustion in engine 10 can be of various types, depending on operating conditions. While FIG. 2 depicts a spark ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve.

An intake air heating device 17 is shown arranged in intake manifold 44. Air intake heating device 17 is one example of intake air heater 7 described above with respect to FIG. 1. Similar to the embodiments described above, intake air heating device 17 may be an electric heater configured to heat the intake air prior to reaching cylinder 30. Additional detail regarding control routines for operating the intake air heating device will be described in more detail below with respect to FIG. 4.

A charge air cooler 154 may be included downstream from compressor 162 and upstream of intake air heating device 17 and intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155. Further, charge air cooler 154 is depicted has including a bypass line, wherein the compressed air may bypass the charge air cooler 154, for example when intake air heating is desired.

Further, in the disclosed embodiments, an EGR system may route a desired portion of exhaust gas from exhaust passage 48 to intake manifold 44. FIG. 2 shows an HP-EGR system and an LP-EGR system, but an alternative embodiment may include only an LP-EGR system or only an HP-EGR system. Further, in another embodiment of the present disclosure, the engine may not include a turbocharger, and as such a single (non-HP or LP) EGR system may be present. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example. Similar to charge air cooler 154, HP-EGR cooler 146 may also include a bypass line.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of O2, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), HC, or CO sensor. Further, exhaust passage 48 may include additional sensors, including a NOx sensor 128 and a particulate matter (PM) sensor 129, which indicates PM mass and/or concentration in the exhaust gas. In one example, the PM sensor may operate by accumulating soot particles over time and providing an indication of the degree of accumulation as a measure of exhaust soot levels.

Emission control devices 71 and 72 are shown arranged along exhaust passage 48 downstream of exhaust gas sensor 126. Devices 71 and 72 may be a selective catalytic reduction (SCR) system, three way catalyst (TWC), NOx trap, various other emission control devices, or combinations thereof. For example, device 71 may be a TWC and device 72 may be a particulate filter (PF). In some embodiments, PF 72 may be located downstream of TWC 71 (as shown in FIG. 2), while in other embodiments, PF 72 may be positioned upstream of TWC 72 (not shown in FIG. 2).

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 2 shows only one cylinder of a multi-cylinder engine, and that each cylinder may similarly include its own set of intake/exhaust valves, fuel injector, etc.

Figure 3A:
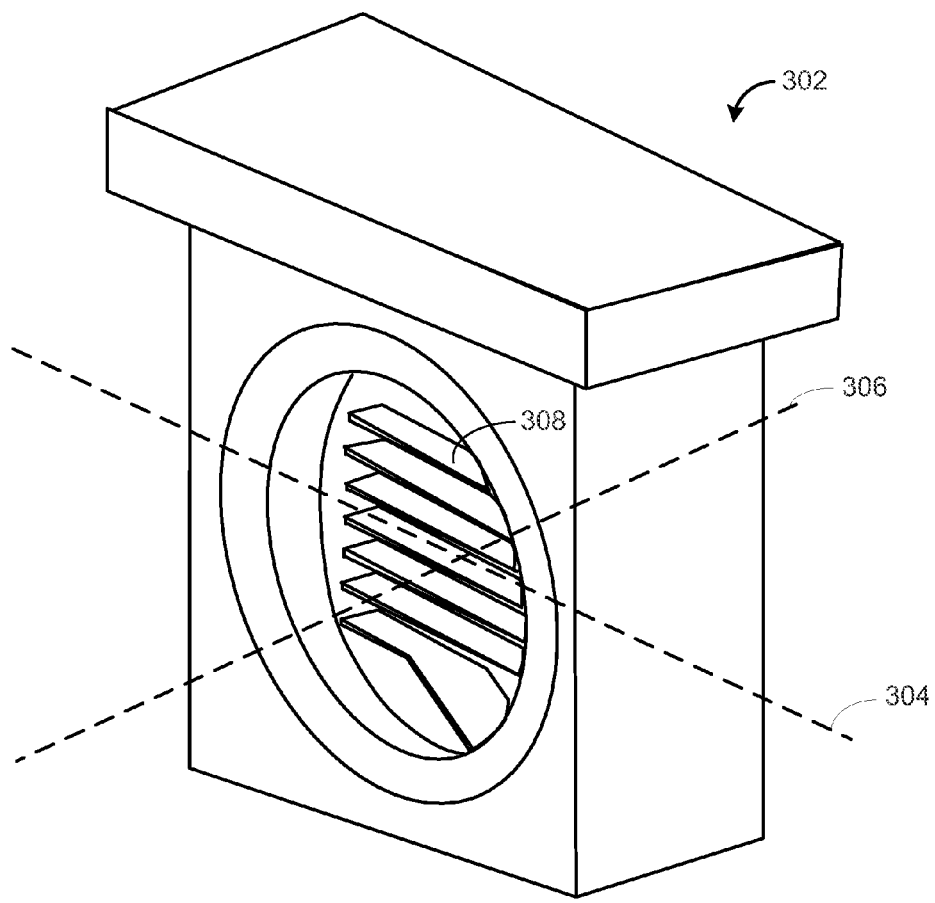
FIGS. 3A-E schematically show an example intake air heating device.

FIGS. 3A-E schematically show an example heating device and various embodiments for heating element configurations. FIG. 3A schematically shows an example intake air heating device 302. Intake air heating device 302 may be included in the internal combustion engine 1 of FIG. 1 (as intake air heating device 7) and in the engine system 10 of FIG. 2 (as intake air heating device 17). Intake air heating device 302 includes a casing surrounding a plurality of strip-like heating elements 308. The heating elements 308 are depicted in FIG. 3A as being arranged in a horizontal manner. However, in some embodiments, they may be arranged in a vertical manner. The heating elements 308 are configured to have a narrow end facing towards the flow of intake air, which travels in a direction parallel to axis 306. As explained previously, the heating elements may have a tapered end towards the direction of the airflow, a tapered end away from the direction of the airflow, may be substantially flat, or may taper in a direction along a horizontal axis 304.

Figures 3B, 3C, 3D, 3E:
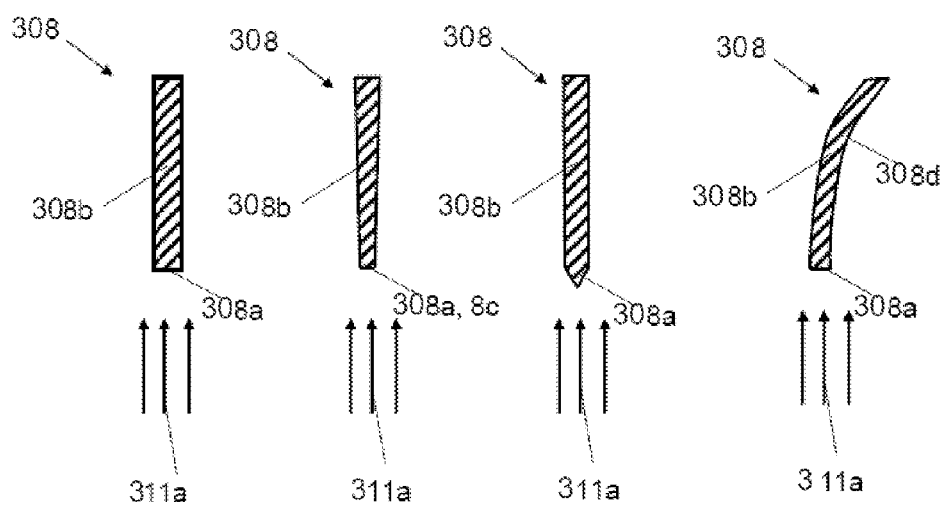

FIG. 3B schematically shows a first embodiment of the strip-like heating element 308 in cross section. The heating element 308 has a cross section 308b of rectangular outline, and a first narrow side 308a of the cross section 308b of said heating element faces toward the intake combustion air flow 311a.

FIG. 3C schematically shows a second embodiment of the strip-like heating element 308 in cross section. It is sought to explain only the differences in relation to the embodiment illustrated in FIG. 3B, for which reason reference is otherwise made to FIG. 3B. The same reference symbols have been used for the same components.

In contrast to the embodiment illustrated in FIG. 3B, the cross section 308b tapers in the direction of the first narrow side 308a, and therefore the strip-like heating element 308 tapers toward a first narrow end side 308c which faces toward the intake combustion air flow 311a.

FIG. 3D schematically shows a third embodiment of the strip-like heating element 308 in cross section. It is sought to explain only the differences in relation to the embodiment illustrated in FIG. 3B, for which reason reference is otherwise made to FIG. 3B. The same reference symbols have been used for the same components.

In contrast to the embodiment illustrated in FIG. 3B, the first narrow side 308a of the cross section 308b, and therefore the first narrow end side 308c of the heating element 308, tapers toward the intake combustion air flow 311a, that is to say counter to the flow direction.

FIG. 3E schematically shows a fourth embodiment of the strip-like heating element 308 in cross section. It is sought to explain only the differences in relation to the embodiment illustrated in FIG. 3B, for which reason reference is otherwise made to FIG. 3B. The same reference symbols have been used for the same components.

In contrast to the embodiment illustrated in FIG. 3B, the strip-like heating element 308 has a blade-like form with a concave side 308d and a convex side.

Figure 4:
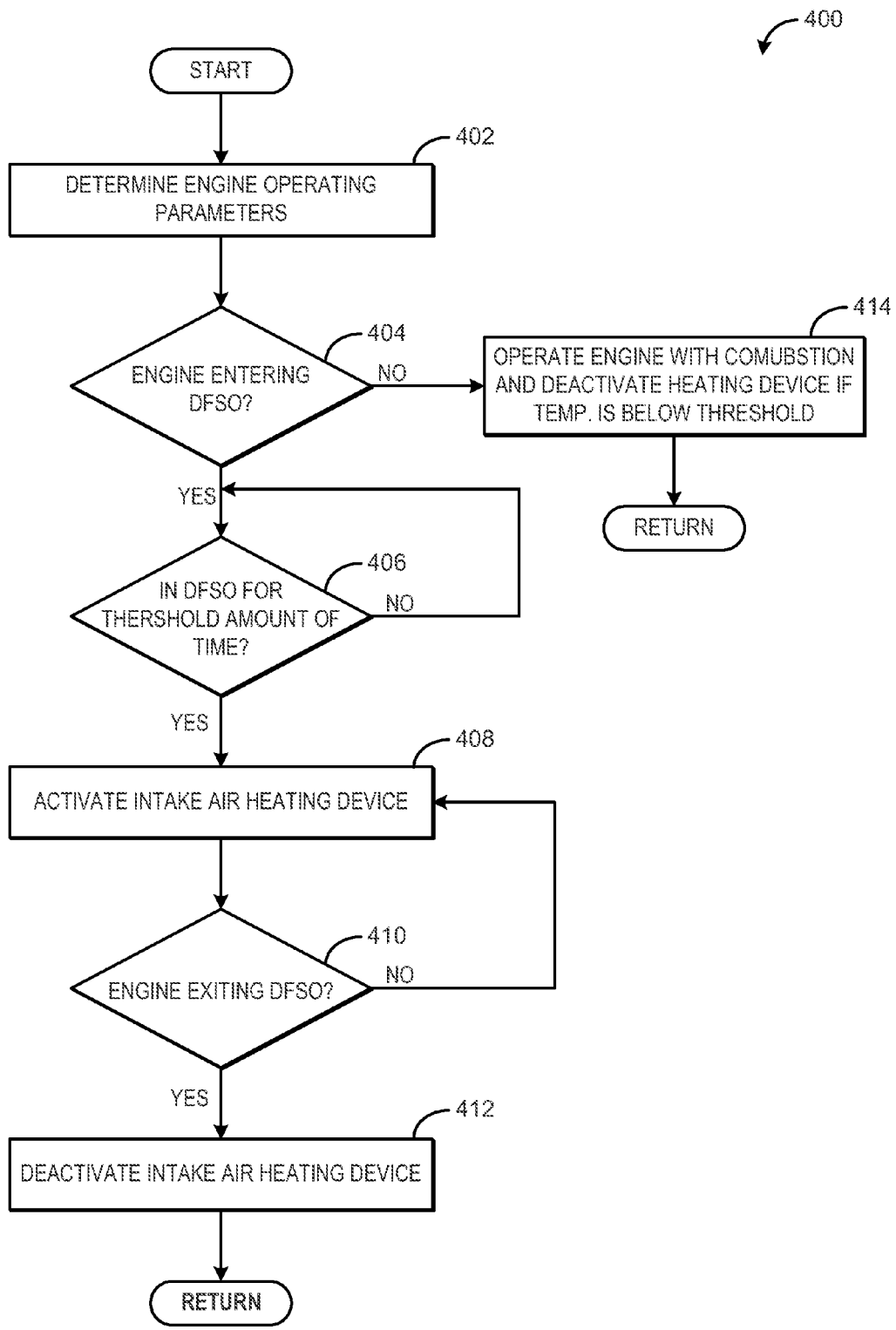
FIG. 4 is a flow chart illustrating a method for operating an intake air heating device according to an embodiment of the present disclosure.

FIG. 4 is a flow chart illustrating a method 400 for controlling operation of an intake air heating device, such as heating device 7, 17, or 302. Method 400 may be carried out by an engine controller, such as controller 12, according to instructions stored in the memory thereof.

At 402, method 400 includes determining engine operating parameters. Engine operating parameters may be determined based on feedback from various engine sensors, and may include engine speed, load, air/fuel ratio, temperature, etc. Further, engine operating parameters may be determined over a given duration, e.g., 10 seconds, in order to determine whether certain engine operating conditions are changing, or whether the engine is operating under steady-state conditions. Method 400 includes, at 404, determining if the engine is entering into deceleration fuel shut-off (DFSO). During DFSO, also referred to in the present disclosure as overrun operation, the engine is operated without fuel injection while the engine rotates and pumps air through the cylinders. DFSO entry may be based on various vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, the DFSO entry conditions may be based on an engine speed below a threshold. In another example, the DFSO entry conditions may be based on an engine load below a threshold. In still another example, the DFSO condition may be based on an accelerator pedal position. Additionally or alternatively, entry into DFSO may be determined based on a commanded signal to cease fuel injection.

If the engine is not operating in DFSO, method 400 proceeds to 414 to operate the engine with combustion and, if exhaust temperature is below a threshold, deactivate the intake air heating device. The threshold exhaust temperature may be a temperature below which catalyst activity may degrade, such as the light-off temperature of the catalyst. Method 400 then returns. If the engine is entering into DFSO, method 400 proceeds to 406 to determine if the engine has been operating with DFSO for a threshold period of time. If no, method 400 returns to continue monitoring the threshold time period. If yes, method 400 proceeds to 408 to activate the intake air heating device to heat the intake air prior to reaching the cylinders. At 410, it is determined if the engine is exiting DFSO. Exit out of DFSO may be indicated by a command to resume fuel injection. In another example, exit out of DFSO may be determined by a change in accelerator pedal position. If the engine is not exiting out of DFSO, method 400 returns to 408 to continue to activate the heating device. If the engine is exiting out of DFSO, method 400 proceeds to 412 to deactivate the heating device. Upon deactivating the intake heating device, method 400 returns.

While method 400 of FIG. 4 shows the intake air heating device being activated and deactivated based on operation in and out of DFSO, respectively, in some embodiments, the intake air heating device may activated or deactivated based on additional operating conditions. For example, a temperature sensor in the exhaust passage may output the temperature of the exhaust, and if it falls below a threshold, then the intake heater may be activated. Further, the intake heater may be continued to be operated until after the engine exits out of DFSO, for example for a predetermined number of engine cycles or until the exhaust temperature reaches a threshold. During engine operation with DFSO and engine operation with combustion, the intake air may be evenly distributed to the cylinders by being routed over a plurality of heating elements in the heating device. The heating elements may be configured to evenly distribute the intake by being arranged vertically, with at least two heating elements being arranged at an acute angle relative to each other, for example.

Thus, method 400 of FIG. 4 provides for an engine method, comprising during a first condition, operating the engine with combustion and deactivating a heating device arranged in an intake manifold of the engine, and during a second condition, operating the engine without combustion and activating the heating device. The method also includes wherein the first condition comprises engine temperature above a threshold, and wherein the second condition comprises engine speed and load below a threshold. The method includes during the first and second conditions, evenly distributing intake air to each cylinder of the engine by routing the intake air through a plurality of heating elements of the heating device. The method includes wherein the plurality of heating elements are arranged vertically and at least two of the plurality of heating elements are arranged at an acute angle with respect to each other.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine having at least one cylinder head and at least two cylinders, in which each cylinder has at least one inlet opening for a supply of combustion air into the cylinder, the method comprising:
activating a heating device for heating the combustion air when the engine is operating in a deceleration fuel shut-off (DFSO) mode including a fuel supply of the engine being deactivated while the engine rotates and the combustion air is supplied to the at least two cylinders, the heating device arranged in an overall intake line coupled to the engine, the overall intake line including at least two merged intake lines, each intake line leading to an inlet opening of a respective cylinder.

2. The method as claimed in claim 1, wherein the heating device for heating the combustion air is activated when the fuel supply to the engine is deactivated for a predefinable time period.

3. The method as claimed in claim 1, wherein the heating device for heating the combustion air is electrically operated.

4. The method as claimed in claim 1, wherein the heating device for heating the combustion air is operated with energy recovered in the DFSO mode of the engine.

5. An internal combustion engine having at least one cylinder head and at least two cylinders, in which each cylinder has at least one inlet opening for a supply of combustion air into the cylinder, comprising:
an intake line leading to each inlet opening;
an overall intake line where the intake lines of at least two cylinders merge;
a heating device arranged in the overall intake line; and
a controller including instructions to, during engine operation, activate the heating device for heating the combustion air when the engine is rotating and a fuel supply of the engine is deactivated.

6. The internal combustion engine as claimed in claim 5, wherein
a distributor junction point is formed where the intake lines of the at least two cylinders merge to form the overall intake line; and
the heating device is arranged adjacent to the distributor junction point at which the intake lines merge to form the overall intake line, a spacing between the heating device and the distributor junction point being smaller than a diameter of a cylinder of the at least two cylinders.

7. The internal combustion engine as claimed in claim 6, wherein the spacing between the heating device and the distributor junction point is smaller than one half of the diameter of the cylinder of the at least two cylinders.

8. The internal combustion engine as claimed in claim 6, wherein the spacing between the heating device and the distributor junction point is smaller than one quarter of the diameter of the cylinder of the at least two cylinders.

9. The internal combustion engine as claimed in claim 5, wherein
the heating device has at least one strip-like heating element, a first narrow side of a cross section of which faces toward intake combustion air flow.

10. The internal combustion engine as claimed in claim 9, in which the at least two cylinders are arranged in series along a longitudinal axis of the at least one cylinder head, wherein the at least one strip-like heating element is aligned substantially horizontally along a line parallel to the longitudinal axis of the at least one cylinder head.

11. The internal combustion engine as claimed in claim 9, in which the at least two cylinders are arranged in series along a longitudinal axis of the at least one cylinder head, wherein the at least one strip-like heating element is aligned substantially vertically, perpendicular to a line parallel to the longitudinal axis of the at least one cylinder head.

12. The internal combustion engine as claimed in claim 9, wherein the at least one strip-like heating element tapers in a direction towards the first narrow side.

13. The internal combustion engine as claimed in claim 9, wherein the cross section of the at least one strip-like heating element is of arc-shaped design, such that the at least one strip-like heating element has a blade-like form.

14. The internal combustion engine as claimed in claim 5, wherein the heating device has at least two strip-like heating elements which are arranged spaced apart from one another.

15. The internal combustion engine as claimed in claim 14, in which the at least two strip-like heating elements are aligned substantially vertically, perpendicular to a line parallel to a longitudinal axis of the at least one cylinder head, wherein at least two strip-like heating elements are set at an acute angle with respect to one another.

16. An engine method, comprising:
during a first condition, operating the engine with combustion and deactivating a heating device arranged in an intake manifold of the engine; and
during a second condition after an engine start, operating the engine without combustion and activating the heating device.

17. The engine method of claim 16, wherein the first condition comprises engine temperature above a threshold.

18. The engine method of claim 16, wherein the second condition comprises engine speed and load below a threshold.

19. The engine method of claim 16, further comprising during the first and second conditions, evenly distributing intake air to each cylinder of the engine by routing the intake air through a plurality of heating elements of the heating device.

20. The engine method of claim 19, wherein the plurality of heating elements are arranged vertically and at least two of the plurality of heating elements are arranged at an acute angle with respect to each other.

* * * * *